(12) United States Patent
Matsuoka

(10) Patent No.: US 11,696,025 B2
(45) Date of Patent: Jul. 4, 2023

(54) IMAGE PROCESSING APPARATUS CAPABLE OF CLASSIFYING AN IMAGE, IMAGE PROCESSING METHOD, AND STORAGE MEDIUM

(71) Applicant: CANON KABUSHIKI KAISHA, Tokyo (JP)

(72) Inventor: Masaaki Matsuoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 17/009,247

(22) Filed: Sep. 1, 2020

(65) Prior Publication Data
US 2021/0067693 A1 Mar. 4, 2021

(30) Foreign Application Priority Data
Sep. 3, 2019 (JP) .................................. 2019-160662

(51) Int. Cl.
*H04N 23/80* (2023.01)
*G06T 7/70* (2017.01)
(Continued)

(52) U.S. Cl.
CPC ............... *H04N 23/67* (2023.01); *G06T 7/70* (2017.01); *H04N 23/611* (2023.01);
(Continued)

(58) Field of Classification Search
None
See application file for complete search history.

(56) References Cited

U.S. PATENT DOCUMENTS

2009/0322934 A1* 12/2009 Ishii .................... H04N 23/675
　　　　　　　　　　　　　　　　　　　　 348/E5.042
2014/0153827 A1* 6/2014 Krishnaswamy ......... G06T 5/00
　　　　　　　　　　　　　　　　　　　　　　　 382/170
(Continued)

FOREIGN PATENT DOCUMENTS

JP　　　2005-184609 A　　　7/2005
JP　　　2005-286940 A　　　10/2005
(Continued)

OTHER PUBLICATIONS

The above foreign patent documents were cited in the Apr. 17, 2023 Japanese Office Action, a copy of which is enclosed without an English Translation, that issued in Japanese Patent Application No. 2019-160662.

*Primary Examiner* — Quan Pham
(74) *Attorney, Agent, or Firm* — Cowan, Liebowitz & Latman, P.C.

(57) ABSTRACT

An image processing apparatus comprises an image acquisition unit configured to acquire an image, an evaluation value acquisition unit configured to acquire an evaluation value of the image, a reliability acquisition unit configured to acquire reliability of the evaluation value, an evaluation unit configured to evaluate the image based on the evaluation value; and a recording unit configured to add a rating result of the image to the image and record the rating result, wherein the evaluation unit performs rating in accordance with the evaluation value excluding an evaluation value the reliability of which is relatively low.

19 Claims, 13 Drawing Sheets

| SUBJECT DETECTION FEASIBILITY | SUBJECT FRAME AF FRAME AMOUNT OF DEVIATION | FOCUS DETECTION FEASIBILITY | DEFOCUS AMOUNT | AUTO RATING VALUE |
|---|---|---|---|---|
| NEGATIVE | — | — | — | 0 |
| POSITIVE | >TH_POS | — | — | 0 |
| | ≤TH_POS | NEGATIVE | — | 0 |
| | | POSITIVE | >7Fσ | 1 |
| | | | ≤7Fσ | 2 |
| | | | ≤5Fσ | 3 |
| | | | ≤3Fσ | 4 |
| | | | ≤1Fσ | 5 |

701

| SUBJECT DETECTION FEASIBILITY | SUBJECT FRAME AF FRAME AMOUNT OF DEVIATION | AUTO RATING VALUE |
|---|---|---|
| NEGATIVE | — | 0 |
| POSITIVE | >TH_POS | 1 |
| | ≤TH_POS | 2 |

702

(51) Int. Cl.
　　　*H04N 23/63*　　　(2023.01)
　　　*H04N 23/67*　　　(2023.01)
　　　*H04N 23/611*　　(2023.01)
(52) U.S. Cl.
　　　CPC ........... *H04N 23/63* (2023.01); *H04N 23/633* (2023.01); *H04N 23/672* (2023.01); *H04N 23/675* (2023.01); *H04N 23/80* (2023.01)

(56)　　　　　　　References Cited

U.S. PATENT DOCUMENTS

| | | | | |
|---|---|---|---|---|
| 2015/0015735 | A1* | 1/2015 | Rav-Acha | H04N 5/23219 |
| | | | | 348/222.1 |
| 2015/0055854 | A1* | 2/2015 | Marchesotti | G06K 9/6263 |
| | | | | 382/159 |
| 2016/0073036 | A1* | 3/2016 | Chen | H04N 1/2112 |
| | | | | 348/231.2 |
| 2017/0192965 | A1* | 7/2017 | Loscalzo | H04N 1/32128 |

FOREIGN PATENT DOCUMENTS

| | | |
|---|---|---|
| JP | 2008-015754 A | 1/2008 |
| JP | 2011-176386 A | 9/2011 |
| JP | 2012-090103 A | 5/2012 |
| JP | 2012-165080 A | 8/2012 |
| JP | 2012-216918 A | 11/2012 |
| JP | 2013-207634 A | 10/2013 |
| JP | 2017-135435 A | 8/2017 |
| JP | 2018-182477 A | 11/2018 |
| JP | 2019-096364 A | 6/2019 |

\* cited by examiner

| SUBJECT DETECTION FEASIBILITY | SUBJECT FRAME AF FRAME AMOUNT OF DEVIATION | FOCUS DETECTION FEASIBILITY | DEFOCUS AMOUNT | AUTO RATING VALUE |
|---|---|---|---|---|
| NEGATIVE | — | — | — | 0 |
| POSITIVE | >TH_POS | — | — | 0 |
| POSITIVE | ≤TH_POS | NEGATIVE | — | 0 |
| POSITIVE | ≤TH_POS | POSITIVE | >7Fσ | 1 |
| POSITIVE | ≤TH_POS | POSITIVE | ≤7Fσ | 2 |
| POSITIVE | ≤TH_POS | POSITIVE | ≤5Fσ | 3 |
| POSITIVE | ≤TH_POS | POSITIVE | ≤3Fσ | 4 |
| POSITIVE | ≤TH_POS | POSITIVE | ≤1Fσ | 5 |

702

| SUBJECT DETECTION FEASIBILITY | SUBJECT FRAME AF FRAME AMOUNT OF DEVIATION | AUTO RATING VALUE |
|---|---|---|
| NEGATIVE | — | 0 |
| POSITIVE | >TH_POS | 1 |
| POSITIVE | ≤TH_POS | 2 |

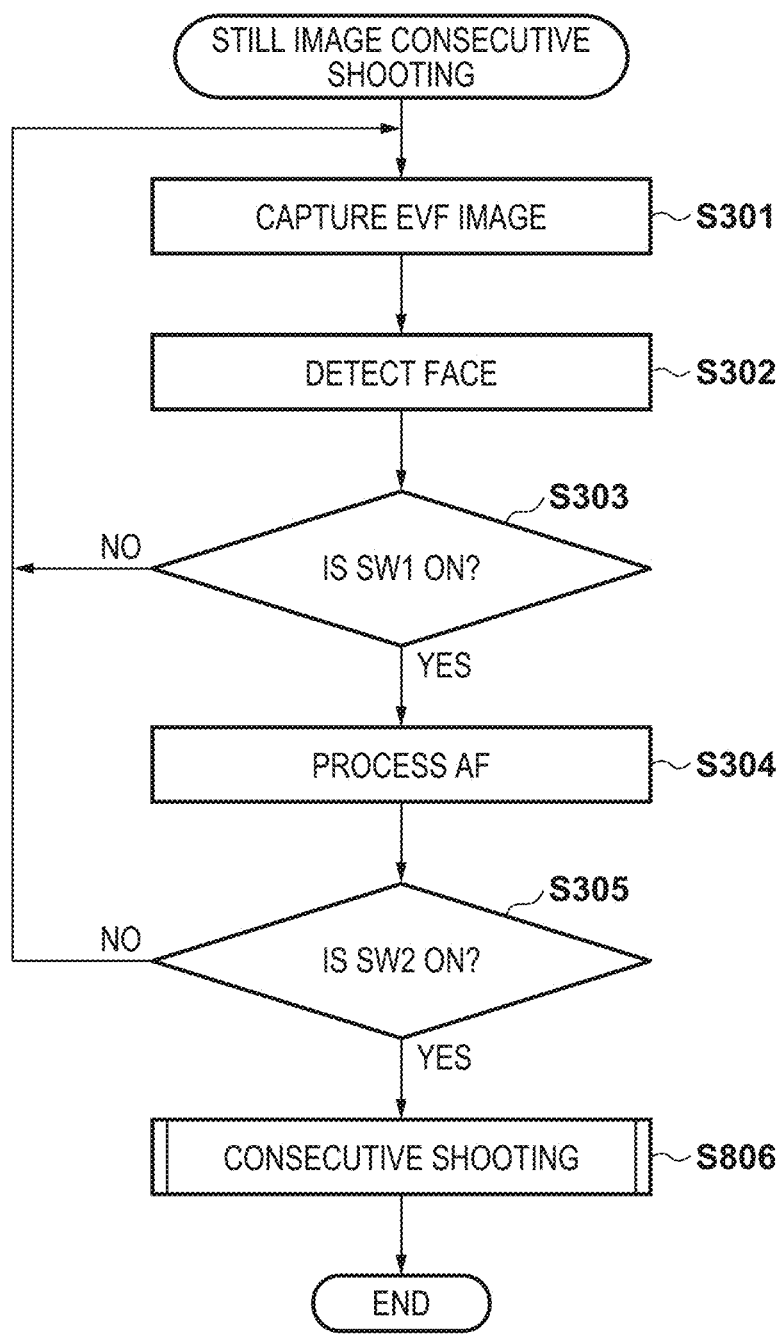

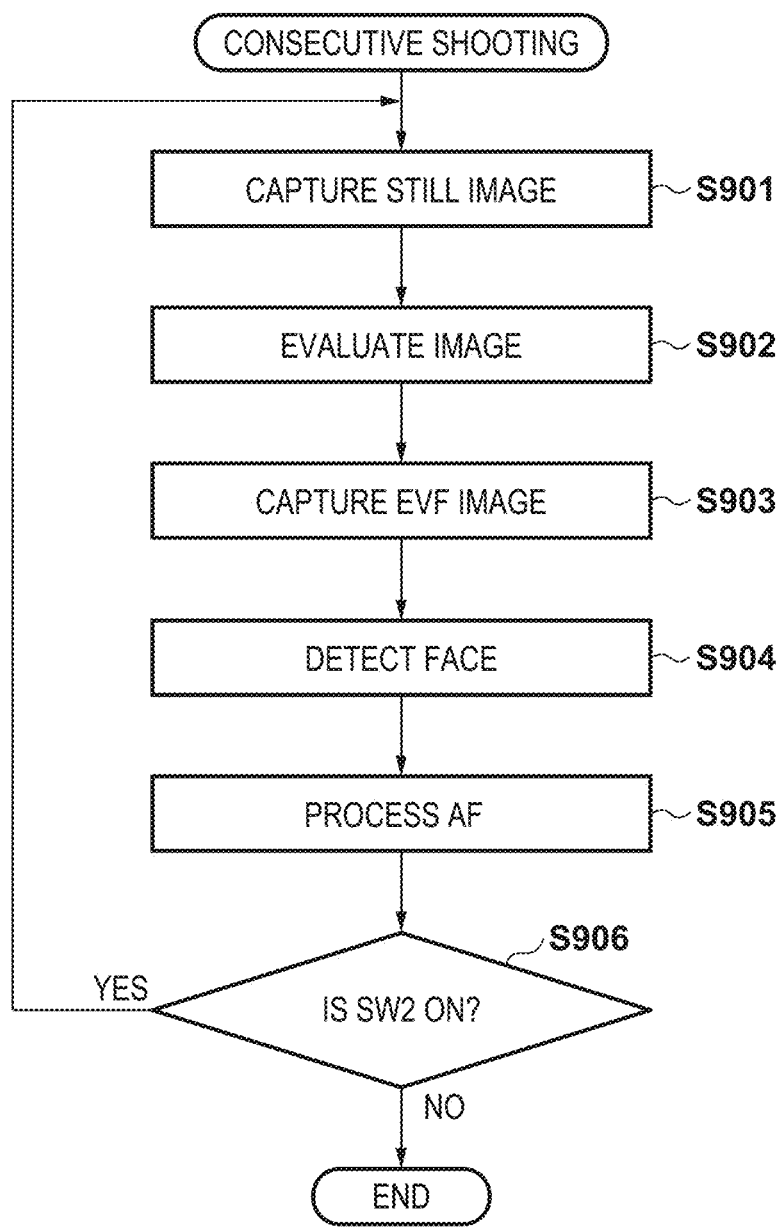

IMAGE PROCESSING APPARATUS CAPABLE OF CLASSIFYING AN IMAGE, IMAGE PROCESSING METHOD, AND STORAGE MEDIUM

BACKGROUND OF THE INVENTION

Field of the Invention

The present invention relates to an image processing apparatus that classifies an image captured under a poor shooting state and an image captured under a good shooting state.

Description of the Related Art

Conventionally, there is known a camera that classifies an image captured under a poor shooting state which involves camera shake, a focus error, exposure deviation, or the like, and an image captured under a good shooting state. For example, Japanese Patent Laid-Open No. 2005-184609 discloses a camera that classifies an image based on an auto-focus evaluation value during shooting, a camera shake evaluation value acquired by a camera shake amount detection sensor, or the like.

Meanwhile, the auto-focus evaluation value, the camera shake evaluation value or the like may not always be acquired stably. For example, in the case of the auto-focus evaluation value, a correct evaluation value cannot be acquired for a subject having low contrast. Additionally, in a case where a background is focused on instead of a subject to be focused on, the auto-focus evaluation value results in a high value due to the background being properly focused on.

As described above, it is not necessarily easy to classify an image captured under a poor shooting state and an image captured under a good shooting state. Then, the conventional technique disclosed in Japanese Patent Laid-Open No. 2005-184609 described above does not take into account the above-described phenomenon, and there is a problem of being unable to properly evaluate a shooting state depending on a scene to be shot.

SUMMARY OF THE INVENTION

The present invention has been made in view of the problems described above, and provides an image processing apparatus that enables proper evaluation of a shooting state in a variety of shooting scenes to be shot.

According to a first aspect of the present invention, there is provided an image processing apparatus comprising: at least one processor or circuit configured to function as: an image acquisition unit configured to acquire an image; an evaluation value acquisition unit configured to acquire an evaluation value of the image; a reliability acquisition unit configured to acquire reliability of the evaluation value; an evaluation unit configured to evaluate the image based on the evaluation value; and a recording unit configured to add a rating result of the image to the image and record the rating result, wherein the evaluation unit performs rating in accordance with the evaluation value excluding an evaluation value the reliability of which is relatively low.

According to a second aspect of the present invention, there is provided an image processing method comprising: acquiring an image; acquiring an evaluation value of the image; acquiring reliability of the evaluation value; evaluating the image based on the evaluation value; and adding a rating result of the image to the image and recording the rating result, wherein in the evaluation, rating is performed in accordance with the evaluation value excluding an evaluation value the reliability of which is relatively low.

According to a third aspect of the present invention, there is provided a non-transitory computer-readable storage medium storing a program for causing a computer to function as respective units of an image processing apparatus, the image processing apparatus comprising: an image acquisition unit configured to acquire an image; an evaluation value acquisition unit configured to acquire an evaluation value of the image; a reliability acquisition unit configured to acquire reliability of the evaluation value; an evaluation unit configured to evaluate the image based on the evaluation value; and a recording unit configured to add a rating result of the image to the image and record the rating result, wherein the evaluation unit performs rating in accordance with the evaluation value excluding an evaluation value the reliability of which is relatively low.

Further features of the present invention will become apparent from the following description of exemplary embodiments with reference to the attached drawings.

BRIEF DESCRIPTION OF THE DRAWINGS

FIG. 8 is an explanatory view of an auto-rating value in an embodiment.

FIG. 9 is a flowchart for explaining an operation of consecutive shooting of still images in an embodiment.

FIG. 10 is a flowchart for explaining an operation of image capturing by consecutive shooting in an embodiment.

DESCRIPTION OF THE EMBODIMENTS

Figure 1:
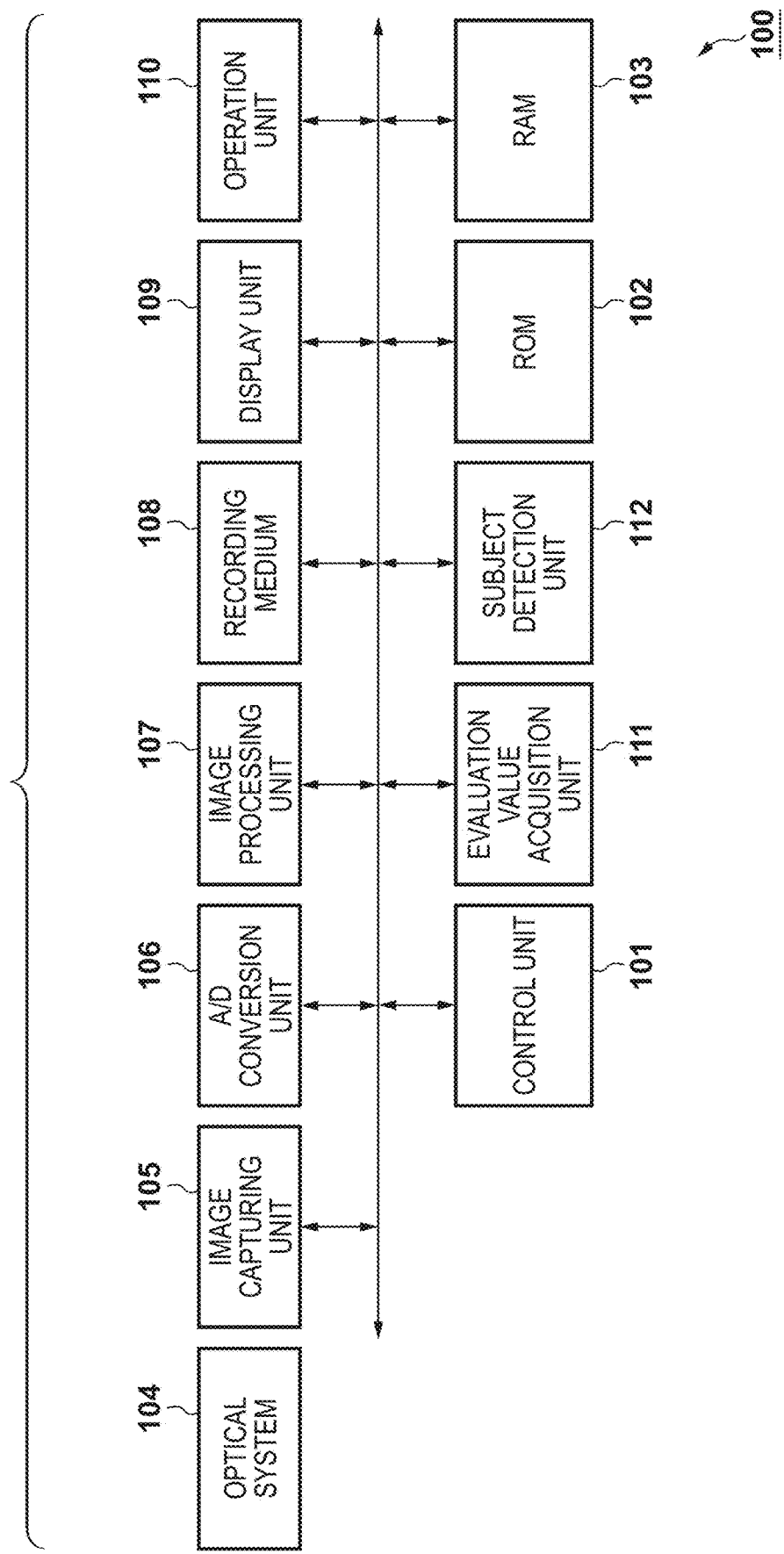
FIG. 1 is a block diagram illustrating a configuration of a digital camera, according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 is a block diagram illustrating a functional configuration of a digital camera that is an embodiment of an image processing apparatus of the present invention.

In FIG. 1, a control unit 101 is, for example, a CPU. The control unit 101 reads out an operation program of each block of a digital camera 100 from a ROM 102, and loads and executes the operation program on a RAM 103 to control an operation of each block. The ROM 102 is a rewritable non-volatile memory, and stores a parameter or the like required for an operation of each block, in addition to the operation program of each block of the digital camera 100. The RAM 103 is a rewritable volatile memory, and is used as a temporary storage area of data output during an operation of each block of the digital camera 100.

An optical system 104 forms a subject image on an image capturing unit 105. The image capturing unit 105 includes, for example, an image capturing element such as a CCD and a CMOS sensor. The image capturing unit 105 performs photoelectric conversion of an optical image formed by the optical system 104, and outputs an obtained analog image signal to an A/D conversion unit 106. The A/D conversion unit 106 performs A/D conversion of an input analog image signal, and stores an obtained digital image data in the RAM 103.

An image processing unit 107 applies various image processing such as white balance adjustment processing, color interpolation processing, reduction/enlargement processing, and filtering processing to image data stored in the RAM 103.

A recording medium 108 is a removable memory card or the like, and records an image stored in the RAM 103 and processed by the image processing unit 107, or an image subjected to A/D conversion by the A/D conversion unit 106, as a recorded image.

A display unit 109 is a display device such as an LCD. The display unit 109 performs through-display of a subject image captured by the image capturing unit 105, and also displays various pieces of information. An operation unit 110 is an operation member including a release button, and instructs an operation such as auto-focusing and releasing. Note that the release button is configured to function in a two-step press, and that an image capturing preparation operation starts with a half-press of the release button (ON of a switch SW1), and an image capturing operation starts with a full press of the release button (ON of a switch SW2).

An evaluation value acquisition unit 111 calculates an evaluation value such as an auto-focus evaluation value from an image data obtained by image capturing with the image capturing unit 105. A subject detection unit 112 detects a subject such as a person's face from obtained image data.

Figure 2:
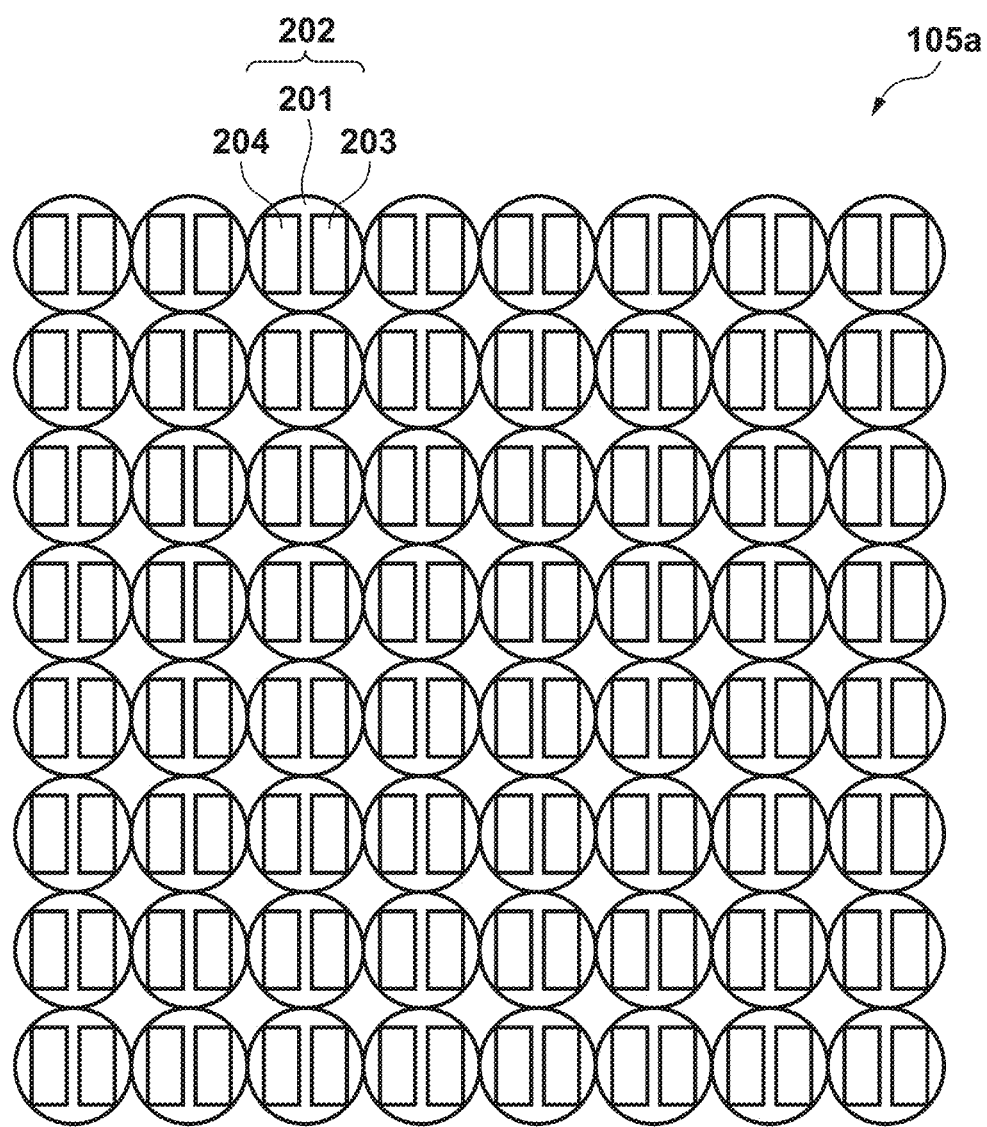
FIG. 2 is an explanatory view of a configuration of an image capturing element in an embodiment.

FIG. 2 is an explanatory view of a configuration of an image capturing element 105a provided in the image capturing unit 105. A pixel 202 includes a microlens 201 and a pair of photoelectric conversion units 203, 204. In the image capturing element 105a, the pixels 202 are regularly arranged two-dimensionally.

In FIG. 2, it is assumed that an image A and an image B are output as a pair of parallax images from the pair of photoelectric conversion units 203, 204 regularly arranged two-dimensionally. According to such a configuration, a pair of light fluxes passing through different regions of a pupil of the optical system 104 of FIG. 1 are formed as a pair of optical images, and the pair of optical images can be output as a pair of the images A and B. Further, the evaluation value acquisition unit 111 of FIG. 1 outputs phase difference distribution of the image A and the image B as an auto-focus evaluation value (focus information), and also outputs a determination result for feasibility of focus detection. As for a method for acquiring the phase difference distribution of the image A and the image B, for example, a method disclosed in Japanese Patent Laid-Open No. 2008-15754 can be used to acquire defocus amount distribution and simultaneously determine feasibility of focus detection.

Additionally, the present invention is not limited to this, and distribution of a shift amount that is an amount of deviation between the image A and the image B may be acquired as the auto-focus evaluation value. Additionally, the shift amount may be multiplied by a detection pitch (arrangement pitch of pixels of the same type) and expressed by a unit of length such as micrometer. Additionally, distribution of a value obtained by normalizing a defocus amount by a focal depth (2Fδ or 1Fδ: F is an aperture value and δ is a permissible confusion circle diameter) may be acquired as the auto-focus evaluation value.

Figure 3:
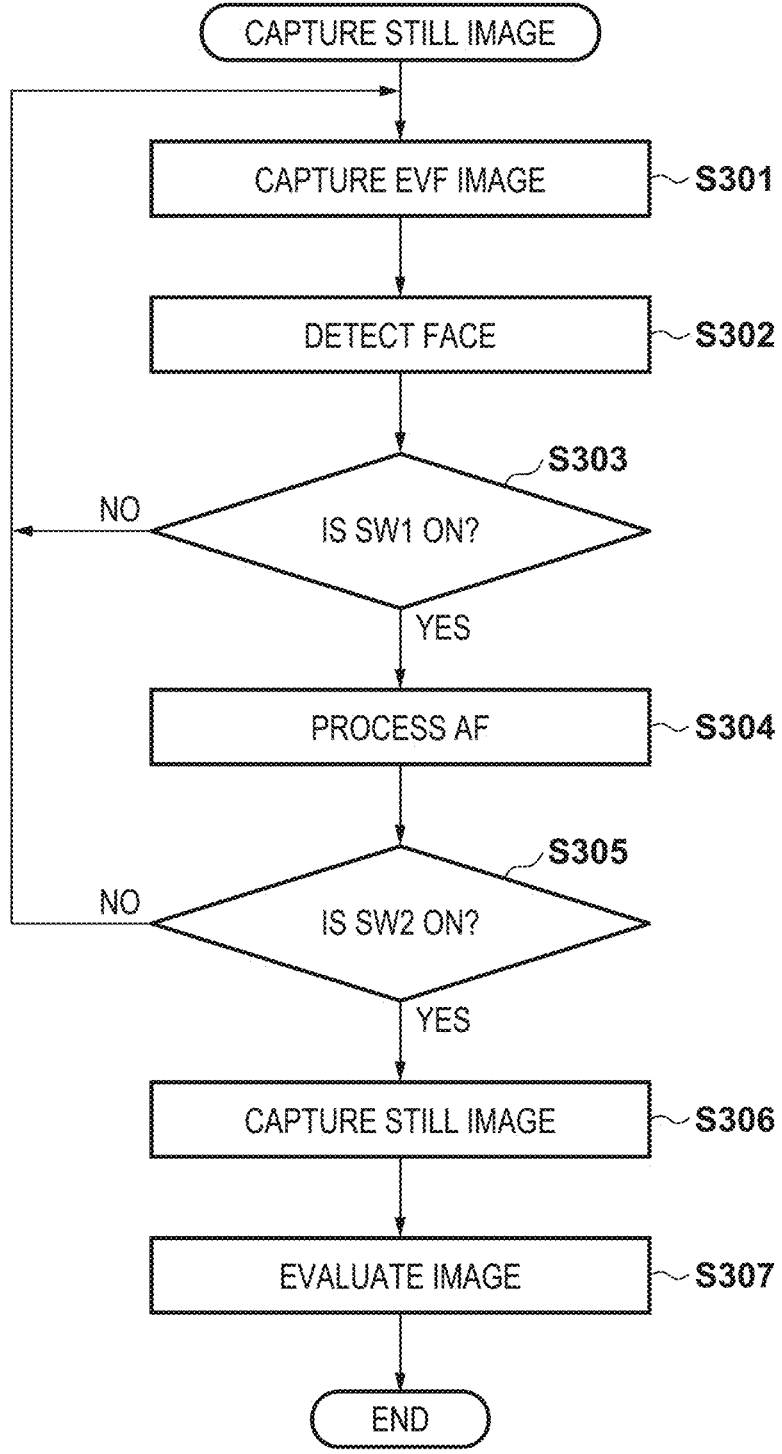
FIG. 3 is a flowchart for explaining an operation of still image shooting in an embodiment.

FIG. 3 is a flowchart for explaining an operation of still image shooting in the digital camera 100 of the present embodiment.

First, at S301, an Electronic View Finder image (EVF image) is captured (image acquisition) for an Electronic View Finder (EVF) function to display a through image on the display unit 109 of FIG. 1. At S302, a person's face is detected from the EVF image by using the subject detection unit 112 of FIG. 1. As for a face detection method, any known method may be used, and for example, a method disclosed in Japanese Patent Laid-Open No. 2005-286940 can be used to acquire a position and a size of a facial frame and face likeness (likelihood). At S303, the release button of the operation unit 110 is half-pressed to determine whether or not the switch SW1 has been turned ON. At S303, S301 and S302 are repeated until an auto-focus instruction (switch SW1 turned ON) is issued.

When the auto-focus instruction is issued, Auto Focus (AF) processing is performed at S304, based on a defocus amount acquired by the evaluation value acquisition unit 111 of FIG. 1 by using the EVF image. At S305, the release button of the operation unit 110 is full-pressed to determine whether or not the switch SW2 has been turned ON. At 305, S301 to S304 are repeated until a release instruction (switch SW2 turned ON) is issued.

When the release instruction is issued, a still image for recording (image for recording) is captured at S306. Finally, evaluation of the image is performed at S307.

In the present embodiment, a person's face is detected from an EVF image in the face detection at S302, but the present invention is not limited to this and a person's face may be detected from a still image for recording. According to such a configuration, a face can be detected from a high-quality still image for recording, and thus detection precision can be increased.

In the following, an operation at S307 of FIG. 3 of acquiring reliability (reliability acquisition) and evaluating an image excluding an evaluation value having relatively low reliability will be described with reference to FIGS. 4 to 7.

Figure 4:
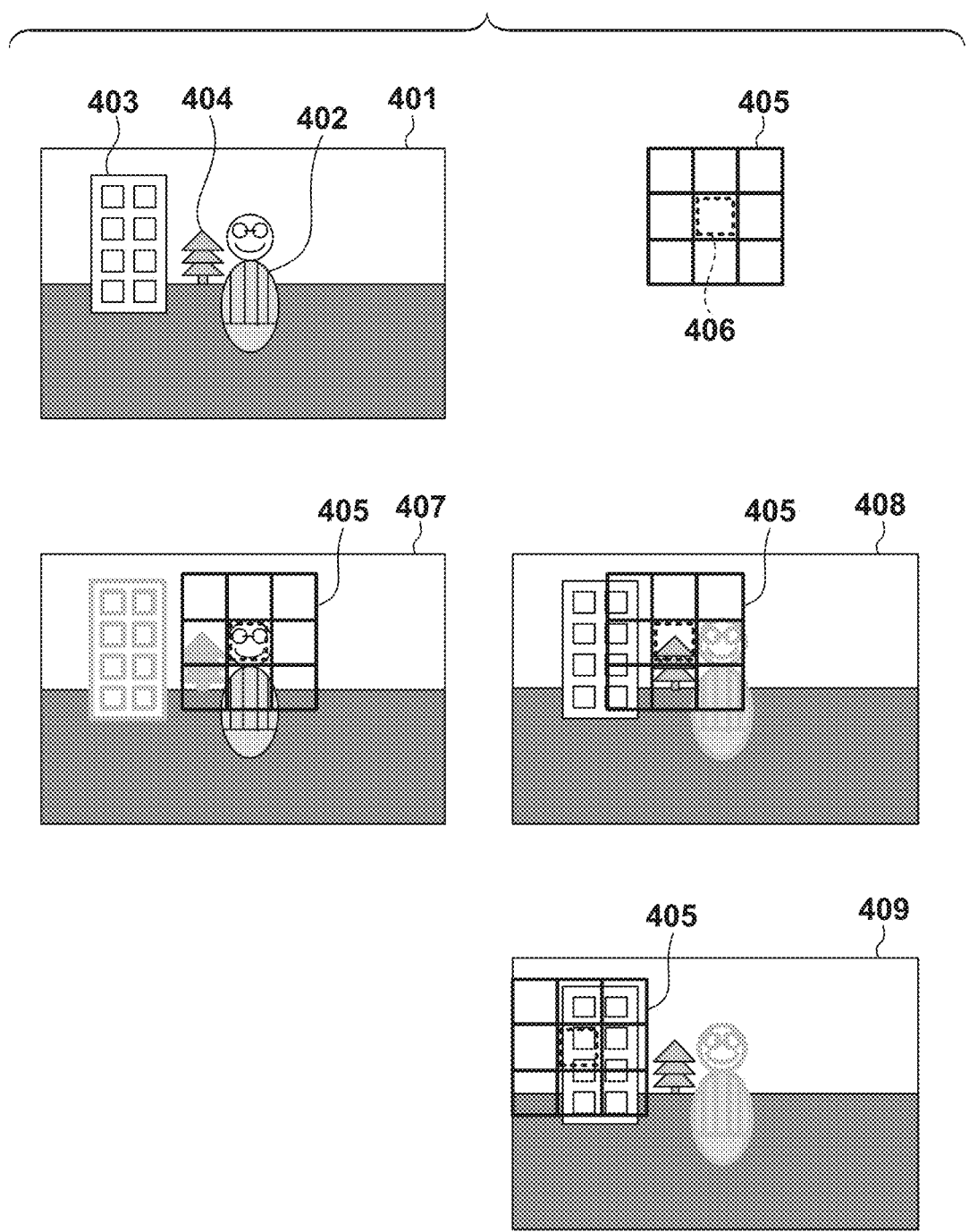
FIG. 4 is an explanatory view of a shooting state of still image shooting in an embodiment.

FIG. 4 illustrates an example of a scene to be captured 401, and a person 402, a building 403, and a tree 404 are aligned from the front side. An auto-focus frame 406, and a frame group 405 of defocus amount distribution that can be acquired by the evaluation value acquisition unit 111 of FIG. 1 are indicated. The auto-focus frame 406 and defocus distribution by 3×3 frames surrounding the auto-focus frame 406 can be acquired. In the present embodiment, defocus amount distribution (evaluation value acquisition) of only a portion of a screen near an auto-focus frame is acquired, but the present invention is not limited to this, and is also applicable in a case where defocus amount distribution has been acquired across a whole screen.

A still image 407 in a case where a person's face is successfully focused on is indicated. Still images 408 and 409 in a case where a background has been erroneously focused on are indicated. In the still image 408, the tree 404 is focused on, and in the still image 409, the building 403 is focused on. In AF processing, a position of an auto-focus frame is determined also with reference to a result of face detection, and the auto-focus frame position is determined also with reference to other indicator such as subject contrast. Therefore, when a high-contrast subject is present in a background, an auto-focus frame may be moved toward the background and, as a result, the background may be focused on erroneously as in the still images 408 and 409.

Additionally, there is only one person's face to be detected in the example of FIG. 4, but in a case where a plurality of persons' faces have been detected, a subject to be focused on is selected, based on a subject position, a subject likelihood, or the like output by the subject detection unit 112 of FIG. 1. For example, a method for prioritizing a subject having a higher subject likelihood, prioritizing a subject at the center of a screen, or prioritizing a subject closer to an auto-focus frame position or a position specified by a user with a touch panel provided on the display unit 109 of FIG. 1 is conceivable. Alternatively, the subject detection unit 112 of FIG. 1 may also perform line-of-sight detection in addition to face detection, and a subject having a line of sight oriented in the direction of the digital camera may be prioritized. Further, a frame may be displayed in a selected subject during still image playback, and thus a user can recognize which subject has been selected.

In the present embodiment, a face is detected from a whole screen, but the present invention is not limited to this, and detection may be limited to a face present in a portion of a screen. For example, detection may be limited to the defocus amount distribution acquisition range indicated by 405 of FIG. 4 and a periphery of this range. According to such a configuration, a face detected from a region having low importance for image evaluation can be excluded, and thus a risk of erroneous face detection can be reduced.

As for a configuration of a still image file, a known file configuration such as the Exif standard may be used, and for example, an optimal image data file structure for group playback compliant with the Exif standard is disclosed in Japanese Patent Laid-Open No. 2012-165080.

Figure 5:
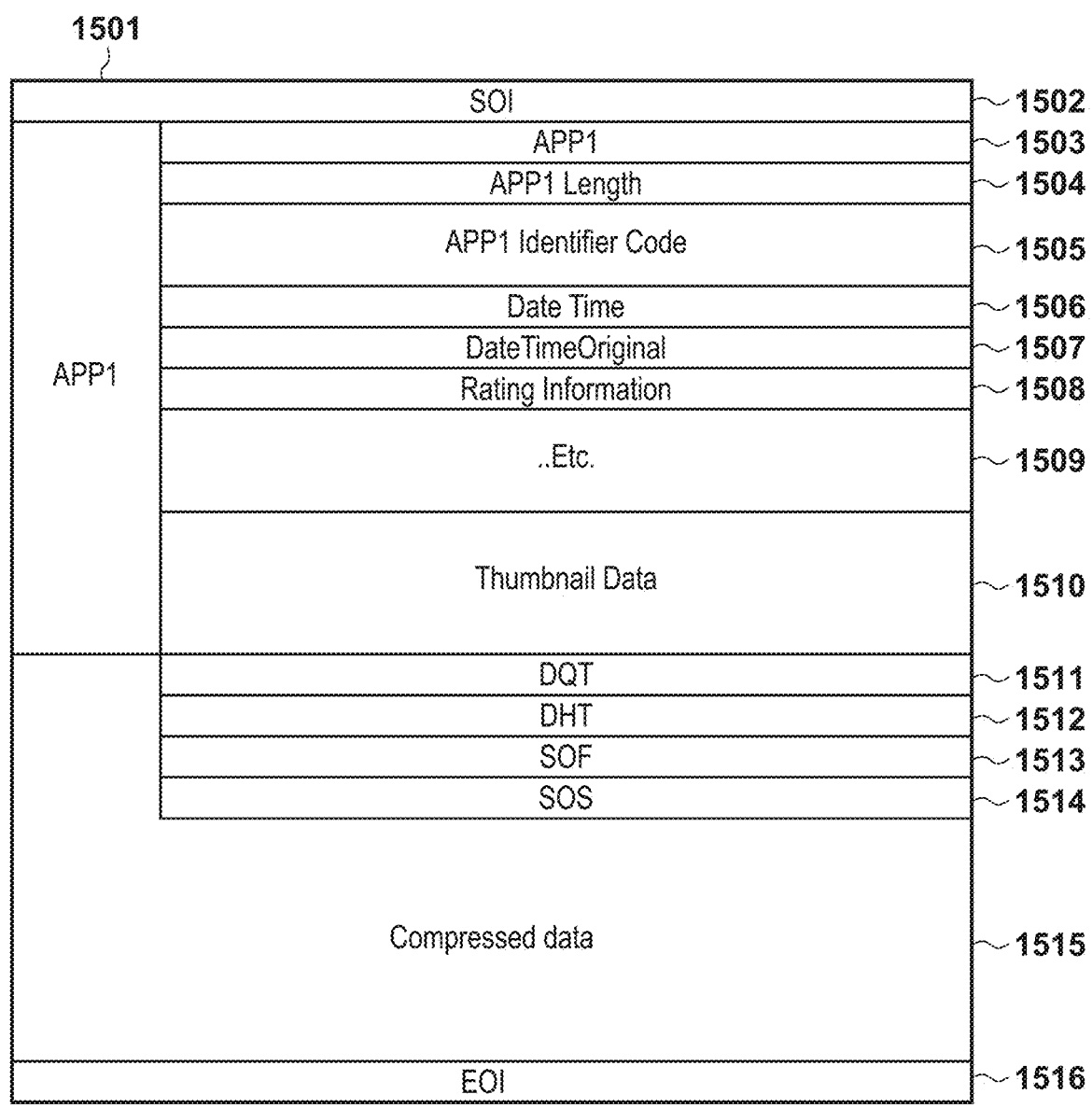
FIG. 5 illustrates a file structure of image data in an embodiment.

FIG. 5 is an explanatory view of a configuration of a still image file to be recorded in the recording medium 108 of FIG. 1. Image data 1501 constituting a still image file includes a marker SOI (1502) at the head, and the marker indicates the start of an image, and is followed by an application marker APP1 (1503). The application marker APP (1503) includes a size (1504) of the APP1, an identification code (1505) of the APP1, DateTime (1506) indicating the creation date and time of the image, DateTimeOriginal (1507) indicating the date and time when the image data is generated, RatingInformation (1508) indicating image rating information, miscellaneous shooting information (1509), and a thumbnail image (1510).

Additionally, as illustrated in FIG. 5, the image data to be recorded includes a quantization table DQT (1511), a Huffman table DHT (1512), a start-of-frame marker SOF (1513), a start-of-scan marker SOS (1514), and compression data 1515. The image data is then terminated with a marker EOI (1516) indicating the end of the image data.

The file structure illustrated in FIG. 5 is a structure defined according to the Exif standard, and is recognizable as an Exif structure by referring to the APP1 (1503) code and the identification code (1505).

In the present embodiment, the file structure is compliant with the Exif standard, but the present invention is not limited to this, and the file structure may be compliant with other standards, or separately, a file structure suitable for realizing the present invention may be defined newly and used.

Figure 6:
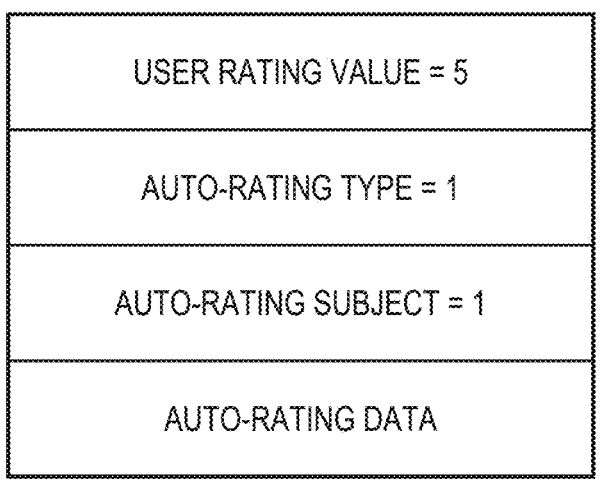
FIG. 6 is an explanatory view of a configuration of image rating information in an embodiment.

FIG. 6 is an explanatory view of a configuration of image rating information to be recorded in a header (application marker APP1) of a still image file to be recorded. The image rating information includes a value of user rating, a type of auto-rating, a subject of auto-rating, and data of auto-rating.

The user rating is an image evaluation value manually evaluated (manually set) by a user. For example, a value 0 indicates that there is no rating result, and values 1 to 5 indicate that there is a rating result with a higher value indicating a higher rating result. The user rating is recorded separately from image evaluation automatically performed by the digital camera. Accordingly, when narrowing search is performed on an image, separate (individual) search can be performed, and thus convenience is improved.

The type of auto-rating is a type of evaluation value for evaluation in the image evaluation at S307 of FIG. 3. For example, a numeral 1 indicates a focus evaluation value, and when a numeral 0 is set, absence of auto-rating data is indicated. Additionally, it is assumed that numerals 2 to 9 indicate reserved areas for future expansion. In the present embodiment, focus is evaluated as image evaluation, but the present invention is not limited to this. Exposure (exposure information), contrast (contrast information), shake (shake information), or the like may be evaluated, and the rating result may be assigned to any of the reserved areas 2 to 9.

The subject of auto-rating is a type of subject detected by the subject detection unit 112 of FIG. 1. For example, a numeral 1 indicates a person and numerals 2 to 9 indicate reserved areas. Alternatively, a subject indicated by an auto-focus frame may be specified without using a result provided by the subject detection unit 112, and in that case, 0 is set. In the present embodiment, the subject detection unit 112 detects a person's face and thus 1 is set. However, the present invention is not limited to this, and a subject other than a person such as an auto-focus frame assigned to 0, an animal, a vehicle, a subject specified by a user with a touch panel on the display unit 109 of FIG. 1 may be detected and assigned to any of the reserved areas 2 to 9.

Figure 7:
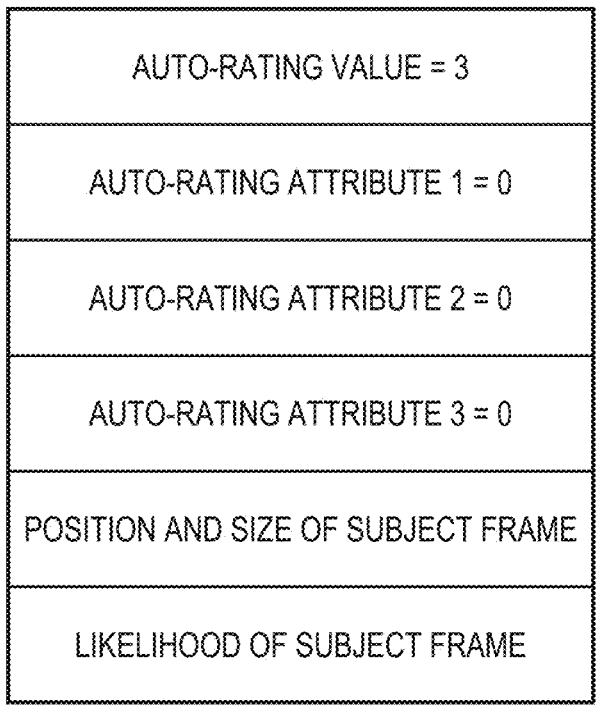
FIG. 7 is an explanatory view of a configuration of auto-rating data in an embodiment.

FIG. 7 is an explanatory view of a configuration of auto-rating data. The auto-rating data includes a value of auto-rating, auto-rating attributes 1 to 3, a position and a size of a subject frame, and a likelihood of a subject frame.

The value of auto-rating is an image evaluation value of automatic evaluation by the digital camera. For example, a value 0 indicates that there is no rating result, and values 1 to 5 indicate that there is a rating result with a higher value indicating a higher rating result.

The auto-rating attribute 1 is set to 0 when the subject detection unit 112 of FIG. 1 has successfully detected a subject. The auto-rating attribute 1 is set to 1 when the subject detection unit 112 cannot detect a subject. Feasibility of subject detection is determined by a likelihood output by the subject detection unit 112. The auto-rating attribute 2 is set to 0 when it is determined that focus detection by the evaluation value acquisition unit 111 of FIG. 1 is feasible, and the auto-rating attribute 2 is set to 1 when it is determined that the focus detection is unfeasible. The auto-rating attribute 3 is set to 0 when an evaluation value has been output at a position where a subject has been detected, and the auto-rating attribute 3 is set to 1 when no evaluation value has been output. For example, in 407 and 408 of FIG. 4, a defocus amount is acquired at a position of a face that is a subject, and thus 0 is set. On the other hand, in 409, no defocus amount has been acquired at a position of a face which is a subject, and thus 1 is set.

According to such a configuration, a user can check afterwards the reason why a still image having no image rating result has not been provided with a rating result, and thus convenience in determining a search condition for performing narrowing search of a still image using an image evaluation result can be improved.

The position and the size of a subject frame, and the likelihood of a subject frame are calculated based on a result output from the subject detection unit 112 of FIG. 1.

FIG. 8 is an explanatory view 701 of a relation among the rating value, the subject detection result, and the defocus amount of FIG. 7. In the case where subject detection is unfeasible, the rating value is set to 0. Even when subject detection is feasible, the rating value is set to 0 in a case where position deviation between a subject and an auto-focus (AF) frame is significant exceeding TH_POS. For example, in 409 of FIG. 4, there is significant deviation between a position of a face which is a subject and an AF frame position and thus the rating value is set to 0. Even when position deviation between a subject and an AF frame is as small as TH_POS or less, the rating value is set to 0 in a case where focus detection is unfeasible. In the case where focus detection is feasible, the smaller the defocus amount at a detected subject position, the higher the rating value is set (a defocus amount threshold is determined by a unit of 1Fδ: F is an aperture value and δ is a permissible confusion circle diameter).

When the rating value is set only based on a defocus amount of an AF frame, a high rating value is set in a case where a background has been erroneously focused on such in 408 or 409 of FIG. 4. However, when the rating value is set based on a defocus amount at a detected subject position as in the present embodiment, a correct rating value can be set.

In the present embodiment, the rating value is set to 0 in a case where a position of a subject and a position of an AF frame deviate significantly exceeding TH_POS, but the present invention is not limited to this. For example, instead of the defocus amount, an amount of position deviation between a subject and an AF frame may be used as an evaluation value to determine the rating value as in 702 of FIG. 8. That is, in 409 in the case of FIG. 4, since auto-focus is performed at a position far away from a position where a face which is a subject has been detected, a good focus state is not expected, and thus a low evaluation value (1) is set in the rating value.

According to such a configuration, even when no defocus amount is output at a position where a subject is detected as in 409 of FIG. 4, an image can be evaluated by using an amount of position deviation between a subject and an AF frame as an evaluation value.

FIG. 9 is a flowchart for explaining an operation of consecutive shooting of still images. S301 to S305 of FIG. 9 are similar to those of the flowchart of still image shooting of FIG. 3. In FIG. 9, when a release instruction is issued (switch SW2 turned ON) at S305, still images for recording are captured by consecutive shooting at S806.

FIG. 10 is a flowchart for explaining an operation of image capturing by consecutive shooting at S806 of FIG. 9.

First, at S901, a still image for recording is captured, and at S902, image evaluation is performed by using results of face detection and AF processing performed before still image capturing.

Next, EVF image capturing, face detection, and AF processing are performed at S903, S904, and S905, respectively, for subsequent still image capturing. At S906, a release instruction is performed (switch SW2 turned ON), and S901 to S905 are repeated while the release instruction is continued, and image capturing ends when the release instruction is released (NO at S906).

In the present embodiment, image evaluation is performed by using the results of face detection and AF processing by EVF image capturing performed before still image capturing, but the present invention is not limited to this. Results of face detection and AF processing by temporally later EVF image capturing and performed for subsequent still image capturing may be used. Accordingly, even in a case where no face has been detected in an EVF captured image captured before still image capturing, it is possible to add an image evaluation result indicating that there is a rating result for the still image to be recorded, provided that a face is detected in an EVF captured image captured after still image capturing.

Additionally, in a case where no face has been detected in both an EVF captured image captured before still image capturing and an EVF captured image captured after still image capturing, face detection may be performed in still image capturing. In this case, results of both the AF processing performed before still image capturing and the AF processing performed after still image capturing may be composited to estimate defocus amount distribution of captured still images.

In the present embodiment, the AF processing is performed by using EVF image capturing prior to still image capturing, but the present invention is not limited to this. AF processing may be performed by using still image capturing of one frame before the current still image capturing, without performing the EVF image capturing at S903 of FIG. 10. In this case, image evaluation is performed by using results of face detection and AF processing performed in the still image capturing of the same frame as the still image to be recorded. According to such a configuration, a consecutive shooting frame rate can be increased as much as EVF image capturing is eliminated, and defocus amount distribution acquired in the same frame as the still image to be recorded can be used. Thus, accurate image evaluation results are added to the recorded still image without a time lag.

In the present embodiment, the subject detection unit 112 of FIG. 1 detects a face, but the present invention is not limited to this, and behavior of a subject may be detected from a time series image group obtained by EVF image capturing or still image capturing. For example, a player spiking in a volleyball game may be detected as a subject, or a player dribbling in a soccer game may be detected as a subject. In addition to the behavior detection, a front-running subject in a hurdle race may be detected (state detection) or a frequently appearing player (with a high appearance frequency) may be detected. According to such a configuration, even in the case of the presence of a plurality of subjects, a desired subject can be detected efficiently, and image evaluation for the desired subject can be performed.

In the present embodiment, only one subject type that is a face can be detected at a time by the subject detection unit 112 of FIG. 1, but the present invention is not limited to this, and a plurality of subject types may be detected simultaneously.

Figure 11:
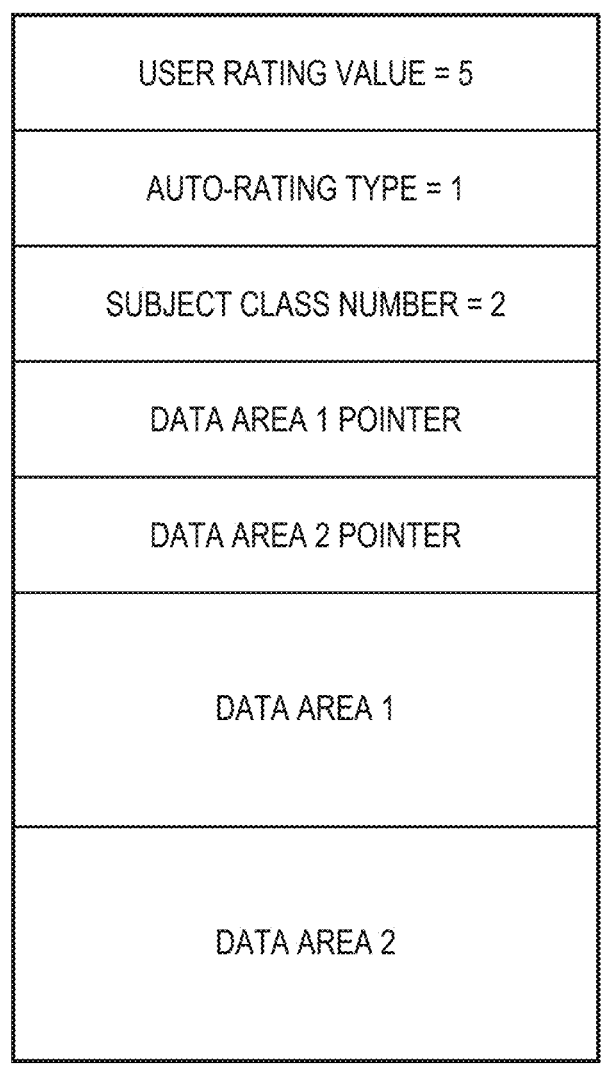
FIG. 11 is an explanatory view of a configuration of image rating information in an embodiment.

FIG. 11 is an explanatory view of a configuration of image rating information to be recorded in a header of a still image file in the case of simultaneously detecting a plurality of subject types. The image rating information includes a value of user rating, a type of auto-rating, the number of subject classes, pointers to data areas 1 and 2, and data areas 1 and 2.

The value of user rating, and the type of auto-rating are similar to those of FIG. 6. The number of subject classes is the number of subject types to be detected simultaneously. The data areas 1 and 2 are areas storing image rating information for each subject type, and the pointers to the data areas 1 and 2 are offset addresses to respective areas.

Figure 12:
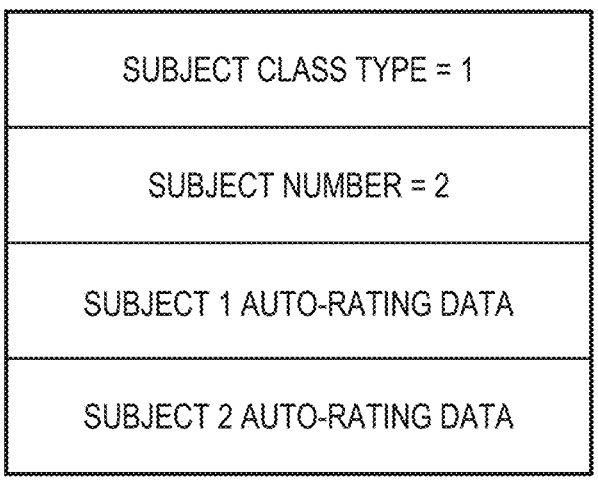
FIG. 12 is an explanatory view of a configuration of a data area in an embodiment.

FIG. 12 is an explanatory view of a configuration of the data areas of FIG. 11. A data area includes a type of subject class, the number of subjects, and auto-rating data of subjects 1 and 2.

The type of subject class is similar to the subject of the auto-rating of FIG. 6. The number of subjects is the number of subjects to be registered with a target data area. For example, in a case where the type of subject class of the target data area is a person, when two persons are detected, a value 2 is set. The auto-rating data of the subjects 1 and 2 is similar to the auto-rating data of FIG. 6.

According to such a configuration, even when a plurality of subject types such as a person and an animal are appearing in the same still image, a desired subject can be extracted without omission when narrowing search or the like of a still image using image evaluation results. Additionally, in a case where a plurality of persons exist with the same type of subject person being set, image evaluation results can be recorded separately, and thus in performing narrowing search of a still image, it is possible to select, for example, use of an image evaluation result of a person at the center of an image, or use of an image evaluation result of a person close to an AF frame even when a value of a subject likelihood is low.

In the present embodiment, only one type of evaluation value that is the defocus amount can be acquired at a time by the evaluation value acquisition unit 111 of FIG. 1, but the present invention is not limited to this, and a plurality of evaluation values may be acquired simultaneously. In addition to the defocus amount, an evaluation value such as exposure, contrast, and shake may be acquired simultaneously.

Figure 13:
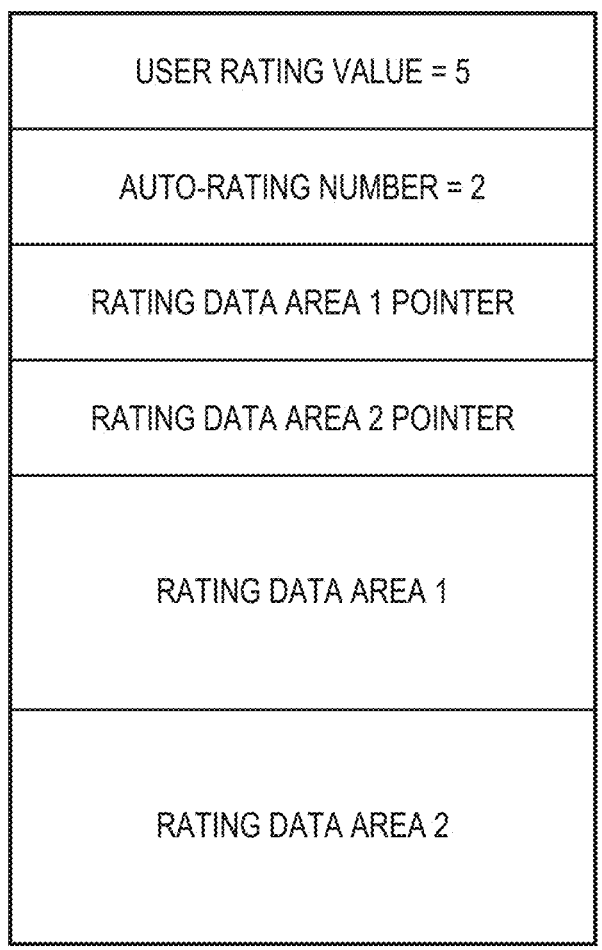
FIG. 13 is an explanatory view of a configuration of image rating information in an embodiment.

FIG. 13 is an explanatory view of a configuration of image rating information to be recorded in a header of a still image file in the case of acquiring a plurality of evaluation values simultaneously. The image rating information includes a value of user rating, the number of types of auto-rating, pointers to rating data areas 1 and 2, and rating data areas 1 and 2.

The value of user rating is similar to that of FIG. 6. The number of types of auto-rating is the number of types of evaluation values to be acquired simultaneously. The rating data areas 1 and 2 are areas storing image rating information for each type of evaluation value, and the pointers to the rating data areas 1 and 2 are offset addresses to respective areas.

Figure 14:
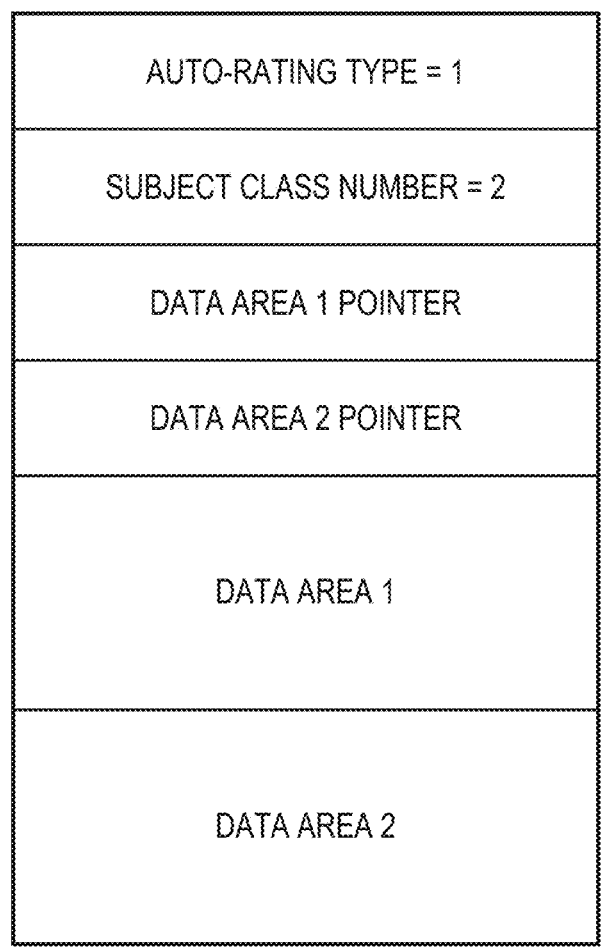
FIG. 14 is an explanatory view of a configuration of a rating data area in an embodiment.

FIG. 14 is an explanatory view of a configuration of the rating data area of FIG. 13. The rating data area includes a type of auto-rating, the number of subject classes, pointers to data areas 1 and 2, and data areas 1 and 2.

The type of auto-rating is a type of evaluation value to be registered in a target auto-rating data area. For example, it is assumed that a numeral 1 indicates a focus evaluation value, 2 indicates an exposure evaluation value, 3 indicates a contrast evaluation value, 4 indicates a shake evaluation value, and when a numeral 0 is set, it indicates absence of target auto-rating data area. Additionally, it is assumed that numerals 5 to 9 indicate reserved areas for future expansion. The number of subject classes, the pointers to the data areas 1 and 2, and the data areas 1 and 2 are similar to those of FIG. 11.

According to such a configuration, narrowing search of a still image using image evaluation results can be performed from various perspectives in addition to focus, and thus user convenience can be improved.

In the present embodiment, image evaluation is performed based on an evaluation value of a subject of interest, but the present invention is not limited to this, and framing of a whole screen may be analyzed to perform image evaluation.

Figure 15:
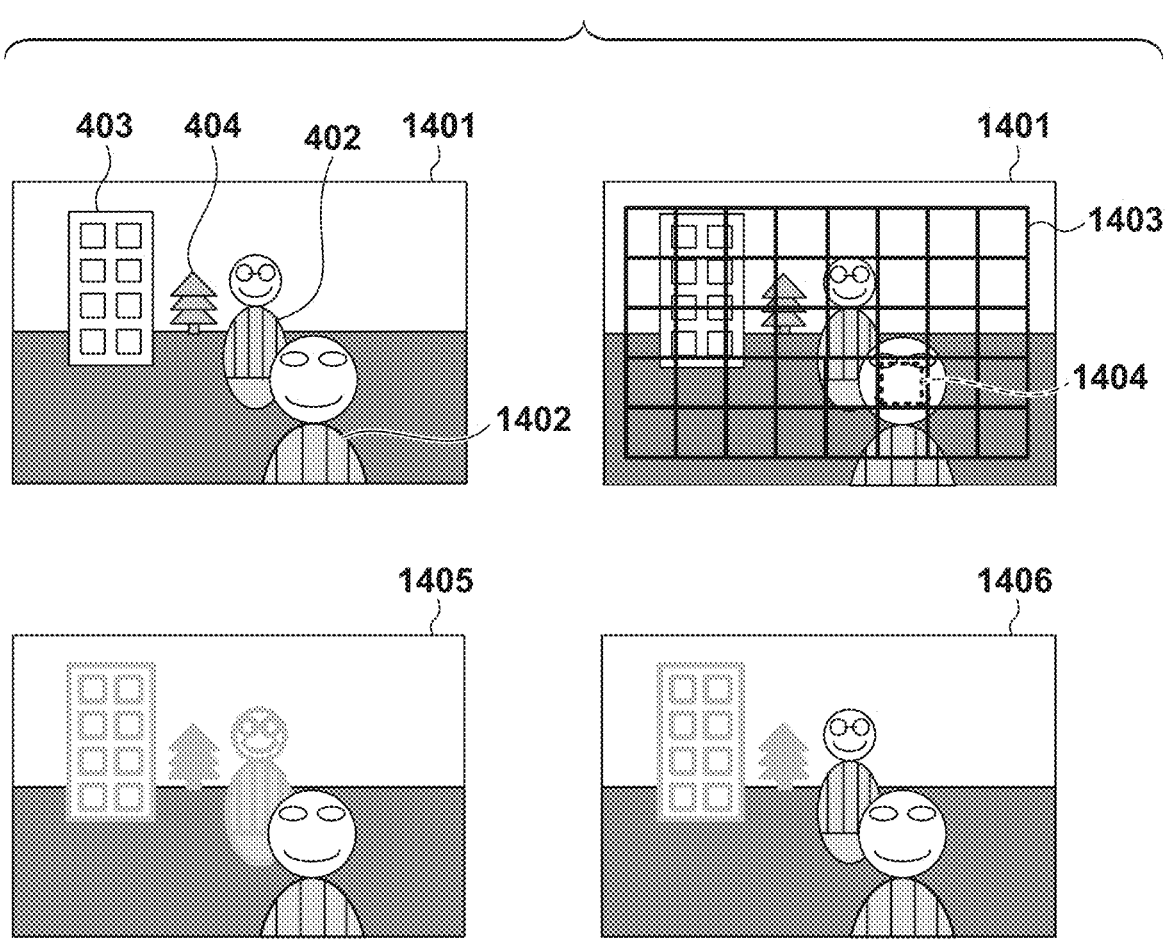
FIG. 15 is an explanatory view of a shooting state of still image shooting in an embodiment.

FIG. 15 is an explanatory view of an operation of analyzing the framing of a whole screen to perform image evaluation. FIG. 15 illustrates an example of a scene to be captured 1401, and 402 to 404 are similar to those of FIG. 4. A person 1402 is a main subject, and is located more frontward than a person 402. An auto-focus frame 1404 is indicated, and a frame group 1403 of defocus amount distribution can be acquired by the evaluation value acquisition unit 111 of FIG. 1. Defocus distribution across a whole screen is acquired.

For example, the framing of a whole screen may be analyzed to provide an image with a high rating result in a case where only a person that is a main subject is focused on, and other persons are not focused on. In an example of such a still image 1405, the person 1402 that is a main subject is focused on, and the other person 402 is not focused on. According to such a configuration, a high rating result is provided to a still image in which an accidentally captured obstructive subject (such as a passer-by walking behind) is kept inconspicuous, and only a main subject is impressively outstanding. This is useful in extracting an impressive portrait scene with narrowing search of a still image.

Additionally, for example, the framing of a whole screen may be analyzed to provide an image with a high rating result in a case where there are a large number of persons focused on. In an example of such a still image 1406, there are two persons of the person 1402 that is a main subject and the person 402, and both the two persons are focused on. On the other hand, in the still image 1405, only one of the two persons is focused on, and thus the still image 1405 is provided with a lower image rating result than the still image 1406. Such a configuration is useful in extracting, by narrowing search of a still image, a scene having a satisfactory image quality as a group photograph.

In the present embodiment, narrowing search of a still image is performed in performing playback by using results of image evaluation, but the present invention is not limited to this. In a case where results of image evaluation are low, a target still image may not be recorded, or still image capturing itself may be stopped. According to such a configuration, recording capacity of the recording medium 108 of FIG. 1 can be saved.

In the present embodiment, narrowing search of a still image using results of image evaluation is performed to playback the still image, but the present invention is not limited to this, and a playback method of a narrowed-down still image may be changed. For example, a more detailed focus checking can be performed by using defocus amount distribution acquired by the evaluation value acquisition unit 111 of FIG. 1 to strengthen coloration or sharpness in a region focused on in a still image or, conversely, strengthen coloration or blur in a region not focused on in a still image, or by reproducing defocus amount distribution instead of a still image.

In the present embodiment, image evaluation is performed in a digital camera, but the present invention is not limited to this, and image evaluation may be performed in an external apparatus such as a mobile device, a personal computer, or a cloud server device. For example, when image evaluation is performed in an external device, subject detection can be performed by the external device, and not only simple subject detection of a person or an animal, but also advanced subject detection such as determination of, for example, even a specific breed of dog can be performed. Therefore, it is possible to realize image narrowing search more suited for application of a user.

In the present embodiment, the defocus amount distribution acquired in the AF processing at the time of shooting is used for image evaluation, but the present invention is not limited to this, and the defocus amount distribution may be acquired after shooting.

For example, acquisition of a phase difference image between the image A and the image B is performed at the time of shooting, and acquisition of the defocus amount distribution is performed after shooting, and thus, the defocus amount distribution can be acquired at any position without being limited to an area near an AF frame. Therefore, it is possible to reduce the number of still images to be evaluated to have no image rating result, and improve the convenience of narrowing search of a still image.

Additionally, when rating based on an evaluation value is high, an image rendered based on the evaluation value or an evaluation value map indicating spatial distribution of the evaluation value may be displayed on the display unit 109.

In the present embodiment, the defocus amount distribution is acquired by an on-imaging surface phase difference method, but the present invention is not limited to this. The defocus amount distribution may be acquired by other focus detection method such as a contrast auto-focus method or a DFD (Depth From Defocus) method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-160662, filed Sep. 3, 2019, which is hereby incorporated by reference herein in its entirety.

What is claimed is:

1. An image processing apparatus comprising:
at least one processor or circuit configured to function as:
an image acquisition unit configured to acquire an image;
an evaluation value acquisition unit configured to acquire an evaluation value of the image;
a reliability acquisition unit configured to acquire reliability of the evaluation value;
an evaluation unit configured to evaluate the image based on the evaluation value; and
a recording unit configured to add a rating result of the image to the image and record the rating result; and
a subject detection unit configured to detect a subject from the image,
wherein
the evaluation unit determines that a reliability of the evaluation value in a case where a distance between a position of the subject detected by the subject detection unit and a position of an auto-focus frame on a screen is larger than a predetermined distance is lower than a reliability of the evaluation value in a case where the distance is not larger than the predetermined distance and performs rating of the images which have been recorded by the recording unit by prioritizing an evaluation value which has higher reliability over an evaluation value which has lower reliability.

2. The image processing apparatus according to claim 1, wherein the evaluation unit prioritizes the evaluation value at a subject position detected by the subject detection unit.

3. The image processing apparatus according to claim 1, wherein the subject detection unit further detects a likelihood of a subject, and the evaluation unit performs evaluation of an image based on the likelihood.

4. The image processing apparatus according to claim 1, wherein the subject detection unit detects at least a first subject and a second subject, and the evaluation unit performs evaluation of the first subject and evaluation of the second subject individually.

5. The image processing apparatus according to claim 3, wherein the at least one processor or circuit is configured to further function as
a setting unit configured to set a subject to be prioritized, based on the subject position or the likelihood.

6. The image processing apparatus according to claim 5, wherein the setting unit prioritizes a subject located near an auto-focus frame or a position indicated by a user.

7. The image processing apparatus according to claim 1, wherein the at least one processor or circuit is configured to further function as a setting unit configured to set a subject to be prioritized based on appearance frequency of a subject, action detection of a subject, or state detection of a subject.

8. The image processing apparatus according to claim 5, wherein the evaluation value acquisition unit acquires, as a new evaluation value, a difference between an evaluation value of a prioritized subject and an evaluation value of other subject, and the evaluation unit composes the evaluation value of the prioritized subject and the evaluation value of the other subject to evaluate an image.

9. The image processing apparatus according to claim 1, wherein, in a case where the subject detection unit has detected a plurality of subjects, the evaluation unit evaluates an image based on a number of subjects.

10. The image processing apparatus according to claim 1, further comprising a display device configured to display an image, wherein an image searched for based on the evaluation value is displayed on the display device.

11. The image processing apparatus according to claim 10, wherein an image rendered based on the evaluation value or an evaluation value map representing spatial distribution of the evaluation value is displayed on the display device.

12. The image processing apparatus according to claim 1, wherein an image having a rating result based on the evaluation value which has lower reliability is not recorded in the recording unit.

13. The image processing apparatus according to claim 1, wherein the image acquisition unit acquires an electronic view finder image and an image for recording, and the subject detection unit detects a subject from the electronic view finder image.

14. The image processing apparatus according to claim 1, wherein the image acquisition unit acquires an electronic view finder image and an image for recording, and the subject detection unit detects a subject from the image for recording.

15. The image processing apparatus according to claim 1, wherein the evaluation value includes any of image focus information, exposure information, contrast information, and shake information.

16. The image processing apparatus according to claim 15, wherein the focus information includes information based on a shift amount representing parallax or information based on a defocus amount.

17. The image processing apparatus according to claim 1, further comprising a manual setting device by which a user manually sets a rating result.

18. An image processing method comprising:
acquiring an image;
acquiring an evaluation value of the image;
acquiring reliability of the evaluation value;
evaluating the image based on the evaluation value;
adding a rating result of the image to the image and recording the rating result to a recording device; and
detecting a subject from the image,
wherein
in the evaluation, it is determined that a reliability of the evaluation value in a case where a distance between a position of the subject detected in the detecting step and a position of an auto-focus frame on a screen is larger than a predetermined distance is lower than a reliability of the evaluation value in a case where the distance is not larger than the predetermined distance and rating of the images which have been recorded by the recording device is performed by prioritizing an evaluation value which has higher reliability over an evaluation value which has lower reliability.

19. A non-transitory computer-readable storage medium storing a program for causing a computer to function as respective units of an image processing apparatus, the image processing apparatus comprising:
an image acquisition unit configured to acquire an image;
an evaluation value acquisition unit configured to acquire an evaluation value of the image;
a reliability acquisition unit configured to acquire reliability of the evaluation value;
an evaluation unit configured to evaluate the image based on the evaluation value; and
a recording unit configured to add a rating result of the image to the image and record the rating result; and
a subject detection unit configured to detect a subject from the image, wherein
the evaluation unit determines that a reliability of the evaluation value in a case where a distance between a position of the subject detected by the subject detection unit and a position of an auto-focus frame on a screen is larger than a predetermined distance is lower than a reliability of the evaluation value in a case where the distance is not larger than the predetermined distance and performs rating of the images which have been recorded by the recording unit by prioritizing an evaluation value which has higher reliability over an evaluation value which has lower reliability.

* * * * *